(12) United States Patent
Young et al.

(10) Patent No.: US 11,858,454 B2
(45) Date of Patent: Jan. 2, 2024

(54) TETHER DESIGN FOR AIRBAG ASSEMBLIES

(71) Applicant: Autoliv ASP, Inc., Ogden, UT (US)

(72) Inventors: Anthony Young, Brigham City, UT (US); Xiahong Wang, Farmington, UT (US); Devin Steve Silverwood, Clinton, UT (US); HongSeok Kim, North Salt Lake, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 17/735,987

(22) Filed: May 3, 2022

(65) Prior Publication Data

US 2023/0356686 A1    Nov. 9, 2023

(51) Int. Cl.
*B60R 21/239* (2006.01)
*B60R 21/00* (2006.01)
*B60R 21/2338* (2011.01)

(52) U.S. Cl.
CPC .... *B60R 21/239* (2013.01); *B60R 2021/0051* (2013.01); *B60R 2021/23382* (2013.01)

(58) Field of Classification Search
CPC .... B60R 2021/0051; B60R 2021/0053; B60R 2021/23169; B60R 2021/23382; B60R 21/205; B60R 21/206; B60R 21/2338; B60R 21/239
See application file for complete search history.

(56) References Cited

U.S. PATENT DOCUMENTS

| | | | | |
|---|---|---|---|---|
| 5,738,368 A | * | 4/1998 | Hammond | B60N 2/68 280/730.1 |
| 6,685,217 B2 | * | 2/2004 | Abe | B60R 21/233 280/743.2 |
| 7,350,801 B2 | * | 4/2008 | Nakayama | B60R 21/2338 280/743.1 |
| 7,571,929 B2 | * | 8/2009 | Fukawatase | B60R 21/206 280/731 |
| 7,578,517 B2 | * | 8/2009 | Fukawatase | B60R 21/2346 280/743.2 |
| 8,393,638 B2 | * | 3/2013 | Gottschalk | B60R 21/231 280/752 |
| 9,180,835 B2 | * | 11/2015 | Fukawatase | B60R 21/231 |

(Continued)

FOREIGN PATENT DOCUMENTS

| | | | | |
|---|---|---|---|---|
| JP | 2014073720 A | * | 4/2014 | B60R 21/233 |
| JP | 2017144840 A | * | 8/2017 | |
| JP | 2018149841 A | * | 9/2018 | |

*Primary Examiner* — Laura Freedman
(74) *Attorney, Agent, or Firm* — Matthew D. Thayne; Thayne and Davis LLC

(57) ABSTRACT

Airbag cushions and related assemblies comprising improved internal tethers for reshaping deployment. In some embodiments, the assembly may comprise an inflatable cushion and an internal tether comprising an elongated axis positioned within the inflatable cushion, wherein the internal tether comprises a first concave portion attached to a first internal surface of the inflatable cushion and a second concave portion attached to a second internal surface of the inflatable cushion. The first concave portion and the second concave portion may be configured to redirect inflation of the inflatable cushion to form, upon deployment, two enlarged deployment regions and a reduced deployment region between the two enlarged deployment regions.

20 Claims, 4 Drawing Sheets

(56) References Cited

U.S. PATENT DOCUMENTS

| | | | |
|---|---|---|---|
| 9,592,787 B2* | 3/2017 | Jung | B60R 21/237 |
| 9,994,185 B2* | 6/2018 | Deng | B60R 21/213 |
| 10,457,243 B2* | 10/2019 | Munsee | B60R 21/239 |
| 10,618,494 B2* | 4/2020 | Anae | B60R 21/206 |
| 10,974,684 B2* | 4/2021 | Enders | B60R 21/2338 |
| 2016/0288757 A1* | 10/2016 | Ando | B60R 21/2338 |

* cited by examiner

TETHER DESIGN FOR AIRBAG ASSEMBLIES

SUMMARY

Airbag cushions are often configured to provide protection to a vehicle occupant's knees. However, the contours of this region of a vehicle often introduce difficulties that can render deployment kinematics less than ideal. For example, the steering column and/or steering column shroud on the driver's side of vehicles create large gaps on either side of the steering column in between the driver's knees, the steering column/shroud, and the adjacent panel. These gaps may cause many airbag cushions to pivot a driver's legs, deflect, or otherwise perform in an undesirable manner. In addition, many such airbag cushions fail to include features to shift inflation gases towards and/or provide enhanced size/protection in regions that are more critical for protecting an occupant, such as regions on either side of the steering column corresponding with an expected location of the driver's knees.

The present inventors have therefore determined that it would be desirable to provide apparatus, systems and methods that overcome one or more of the foregoing limitations and/or other limitations of the prior art. In some embodiments, the inventive concepts disclosed herein may therefore allow for a driver's side cushion, or other cushions, to be deployed to provide improved protection to the driver's or another occupant's knees and/or lower extremities by limiting/restricting deployment where it is less needed and/or redirecting inflation gas away from such regions towards one or more regions where it will provide better occupant protection. In preferred embodiments, this may be accomplished by providing an internal tether with one or more concavities shaped to enhance the size and/or protective force in enlarged/enhanced deployment regions on opposite sides of a low-profile or reduced deployment region. This effect may be enhanced by providing vent holes in this tether that redirect inflation gases towards the enlarged/enhanced deployment regions.

In a more particular example of a knee airbag cushion assembly according to some embodiments, the airbag cushion assembly may comprise an inflatable cushion configured to be deployed to provide protection to an occupant's lower extremities during an impact event, such as adjacent to a vehicle steering column, for example. The inflatable cushion may comprise an internal tether positioned within the inflatable cushion and coupled to the inflatable cushion such that a first end of the internal tether is configured to be positioned adjacent to a left knee of the occupant during deployment and a second end of the internal tether opposite from the first end is configured to be positioned adjacent to a right knee of the occupant during deployment. The internal tether may comprise an upper end extending between the first end and the second end that defines a concave shape that is positioned and configured to increase a thickness of the inflatable cushion at regions configured to deploy adjacent to the occupant's knees and decrease a thickness of the inflatable cushion at a region configured to deploy adjacent to a space between the occupant's knees.

In some embodiments, the internal tether may further comprise a plurality of vent openings formed therein. In some such embodiments, these vent openings may be biased towards the first and second ends to reinforce the effect of the concave shape by directing inflation gases towards the regions configured to deploy adjacent to the occupant's knees. In some such embodiments, the internal tether may be devoid of vent openings along the region configured to deploy adjacent to the space between the occupant's knees.

In some embodiments, the internal tether may further comprise a lower end extending between the first end and the second end that defines a concave shape that is positioned and configured to increase a thickness of the inflatable cushion at regions configured to deploy adjacent to the occupant's knees and decrease a thickness of the inflatable cushion at the region configured to deploy adjacent to the space between the occupant's knees. In some such embodiments, the upper end extending between the first end and the second end may be sewn to a first internal surface of the inflatable cushion and the lower end extending between the first end and the second end may be sewn to a second internal surface of the inflatable cushion to define a cushion thickness therebetween.

In some embodiments, the internal tether may further comprise a concave shape extending along the first end and a concave shape extending along the second end. In some such embodiments, the internal tether may not be coupled to the inflatable cushion along the concave shape extending along the first end. Similarly, the internal tether may not be coupled to the inflatable cushion along the concave shape extending along the second end.

Some embodiments may further comprise one or more additional internal tethers positioned distally of the internal tether relative to the occupant. One or more of these internal tethers may lack the concavities of the internal tether and/or comprise a rectangular shape.

In example of an airbag cushion assembly according to some embodiments, the assembly may comprise an inflatable cushion and an internal tether comprising an elongated axis positioned within the inflatable cushion. The internal tether may comprise a first concave portion attached to a first internal surface of the inflatable cushion and a second concave portion attached to a second internal surface of the inflatable cushion. The first concave portion and/or the second concave portion may be configured to redirect inflation of the inflatable cushion to form, upon deployment, two enlarged deployment regions and a reduced deployment region between the two enlarged deployment regions.

In some embodiments, the airbag cushion assembly may comprise a knee airbag assembly in which the two enlarged regions are configured to deploy adjacent to a vehicle occupant's knees.

In some embodiments, the internal tether may comprise a plurality of vent openings. In some such embodiments, the plurality of vent openings may be biased towards opposing ends of the elongated axis. In some embodiments, the internal tether may lack any vent openings along a central portion of the internal tether corresponding with the reduced deployment region.

In some embodiments, the internal tether may further comprise a third concave portion extending along a first end of the elongated axis and a fourth concave portion extending along a second end of the elongated axis. In some such embodiments, the third concave portion and the fourth concave portion may be both unattached to the inflatable cushion.

In an example of a knee airbag cushion assembly according to some embodiments, the assembly may comprise an inflatable cushion configured to be deployed to provide protection to a driver or other occupant's knees during an impact event, such as adjacent to a vehicle steering column. The assembly may further comprise a plurality of internal tethers configured to modify deployment characteristics of the inflatable cushion. In some embodiments, at least one of the plurality of tethers comprises a pair of opposing concave sides, wherein each of the opposing concave sides is attached to a respective internal surface of the inflatable cushion to reshape the inflatable cushion during deployment. The at least one of the plurality of tethers may further comprise one or more vent openings configured to enhance the reshaping of the inflatable cushion provided by the pair of opposing concave sides.

In some embodiments, the one or more vent openings may comprise a first vent opening positioned adjacent to a first end of the at least one of the plurality of tethers and a second vent opening positioned adjacent to a second end of the least one of the plurality of tethers.

In some embodiments, the at least one of the plurality of tethers may lack any vent openings between the first vent opening and the second vent opening.

In some embodiments, the plurality of internal tethers may further comprise at least one internal tether lacking any concave sides. In some such embodiments, the plurality of internal tethers may comprise a plurality of internal tethers lacking any concave sides. In some such embodiments, each of the at least one of the plurality of tethers comprising a pair of opposing concave sides may be positioned proximally of each of the plurality of internal tethers lacking any concave sides relative to the driver/occupant.

The features, structures, steps, or characteristics disclosed herein in connection with one embodiment may be combined in any suitable manner in one or more alternative embodiments.

BRIEF DESCRIPTION OF THE DRAWINGS

Non-limiting and non-exhaustive embodiments of the disclosure are described, including various embodiments of the disclosure with reference to the figures, in which.

DETAILED DESCRIPTION

A detailed description of apparatus, systems, and methods consistent with various embodiments of the present disclosure is provided below. While several embodiments are described, it should be understood that the disclosure is not limited to any of the specific embodiments disclosed, but instead encompasses numerous alternatives, modifications, and equivalents. In addition, while numerous specific details are set forth in the following description in order to provide a thorough understanding of the embodiments disclosed herein, some embodiments can be practiced without some or all of these details. Moreover, for the purpose of clarity, certain technical material that is known in the related art has not been described in detail in order to avoid unnecessarily obscuring the disclosure.

As used herein, the term "substantially" refers to the complete or nearly complete extent or degree of an action, characteristic, property, state, structure, item, or result to function as indicated. For example, an object that is "substantially" cylindrical or "substantially" perpendicular would mean that the object/feature is either cylindrical/ perpendicular or nearly cylindrical/perpendicular so as to result in the same or nearly the same function. The exact allowable degree of deviation provided by this term may depend on the specific context. The use of "substantially" is equally applicable when used in a negative connotation to refer to the complete or near complete lack of an action, characteristic, property, state, structure, item, or result. For example, structure which is "substantially free of" a bottom would either completely lack a bottom or so nearly completely lack a bottom that the effect would be effectively the same as if it completely lacked a bottom.

Similarly, as used herein, the term "about" is used to provide flexibility to a numerical range endpoint by providing that a given value may be "a little above" or "a little below" the endpoint while still accomplishing the function associated with the range.

The embodiments of the disclosure may be best understood by reference to the drawings, wherein like parts may be designated by like numerals. It will be readily understood that the components of the disclosed embodiments, as generally described and illustrated in the figures herein, could be arranged and designed in a wide variety of different configurations. Thus, the following detailed description of the embodiments of the apparatus and methods of the disclosure is not intended to limit the scope of the disclosure, as claimed, but is merely representative of possible embodiments of the disclosure. In addition, the steps of a method do not necessarily need to be executed in any specific order, or even sequentially, nor need the steps be executed only once, unless otherwise specified. Additional details regarding certain preferred embodiments and implementations will now be described in greater detail with reference to the accompanying drawings.

Figure 1:
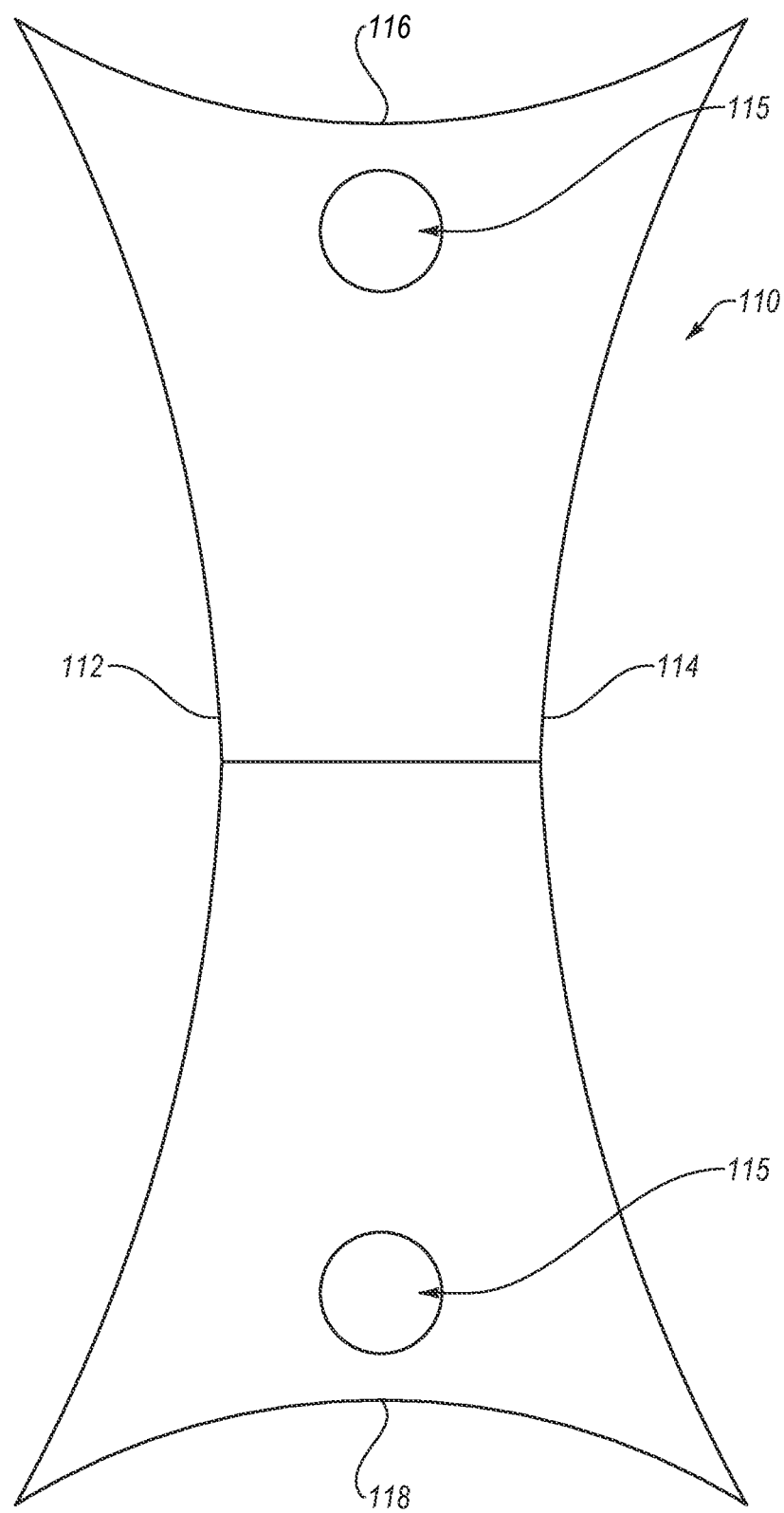
FIG. 1 depicts an embodiment of an internal tether for an airbag assembly according to some embodiments.

FIG. 1 depicts a tether 110 for use in connection with an airbag cushion assembly, such as a knee airbag assembly, according to some embodiments. Tether 110 is specifically configured for use as an internal tether. In other words, it is configured to be positioned within an airbag cushion and, in preferred embodiments, to control deployment characteristics/kinematics by virtue of its unique design, configuration, placement, and/or coupling within an airbag cushion.

As shown in this figure, tether 110 comprises a plurality of concave sides/surfaces/edges. More particularly, tether 110 comprises opposing sides/edges 112/114 that extend along an elongated axis of the tether 110 and that define respective concave shapes and opposing sides/edges 116/118 that extend in a direction between that of the elongated axis of the tether 110 and also define respective concave shapes. As will be discussed in greater detail below, at least one of sides/edges 112/114 is preferably concave (and more preferably, both). Thus, embodiments, in which only one of sides/edges 112/114 is concave, or in which both of sides/edges 112/114 are concave but in which one or both of sides/edges 116/118 are not, are both contemplated.

With respect to sides/edges 116/118, it is less important, although still useful, to form these sides using a concave shape. This is because, in preferred embodiments, only the upper and/or lower edges/sides of the tether 110 are sewn or otherwise attached to an inner surface of the cushion or otherwise coupled to the cushion within the cushion. By contrast, preferably, although not necessarily, sides/edges 116/118 remain unattached to the cushion. Still, however, it may be preferred for certain embodiments and applications to have the shape of the tether 110 be formed with opposing concave shapes 116/118 as well, as this may reduce stress on the ends of the seam or other coupling means where the tether 110 is sewn or otherwise coupled to the cushion—i.e., at the opposing ends of edges 112 and 114. Providing these shapes on all four sides of the tether 110 may therefore be useful to allow the tether 110 to flex more than providing straight edges along these sides of the tether 110 would. However, it should be understood that embodiments are contemplated in which sides 116 and/or 118 are straight, or even convex, rather than being concave as shown in FIG. 1.

As also shown in FIG. 1, one or more vent openings 115 may be formed in tether 110. In preferred embodiments, vent openings 115 are configured to reinforce the effect of the concave shape of one or more of the sides/surface/edges of the tether 110 by, for example, directing inflation gases towards regions configured to deploy adjacent to the occupant's knees for a knee airbag system, for example.

In some embodiments, this reinforcement may be provided by biasing the presence of the vent openings 115 towards opposing ends of the tether 110 that may correspond with ends between the elongated axis of the tether 110 and/or may correspond with ends between which the tether 110 is sewn or otherwise coupled to an inner surface or other inner region of an airbag cushion. In addition, it may be preferred to configure the internal tether 110 so as to be devoid of vent openings along one or more regions, such as regions configured to deploy adjacent to the space between the occupant's knees for a knee airbag assembly.

Thus, in the depicted embodiment, there are two vent openings 115, one positioned adjacent to the end of tether 110 corresponding with edge 116 and the other positioned to the opposite end of tether 110 corresponding with edge 118. As discussed below and illustrated in later figures, the middle portion of tether 110 lacking vent openings may therefore be configured to correspond with and/or be positioned within a region of the airbag cushion to which tether 110 is attached that is intended to have a reduced thickness/gas pressure.

It should be understood, however, that many alternative embodiments are contemplated. For example, a plurality of vent openings may be positioned on either side of a central region of the tether that may be devoid of vent openings. In other embodiments, vent openings may be omitted entirely, particularly if the reshaping of a cushion provided by the concave attachment region(s) of the tether 110 provides sufficient reshaping and/or reconfiguration of the desired airbag deployment kinematics.

Figure 2:
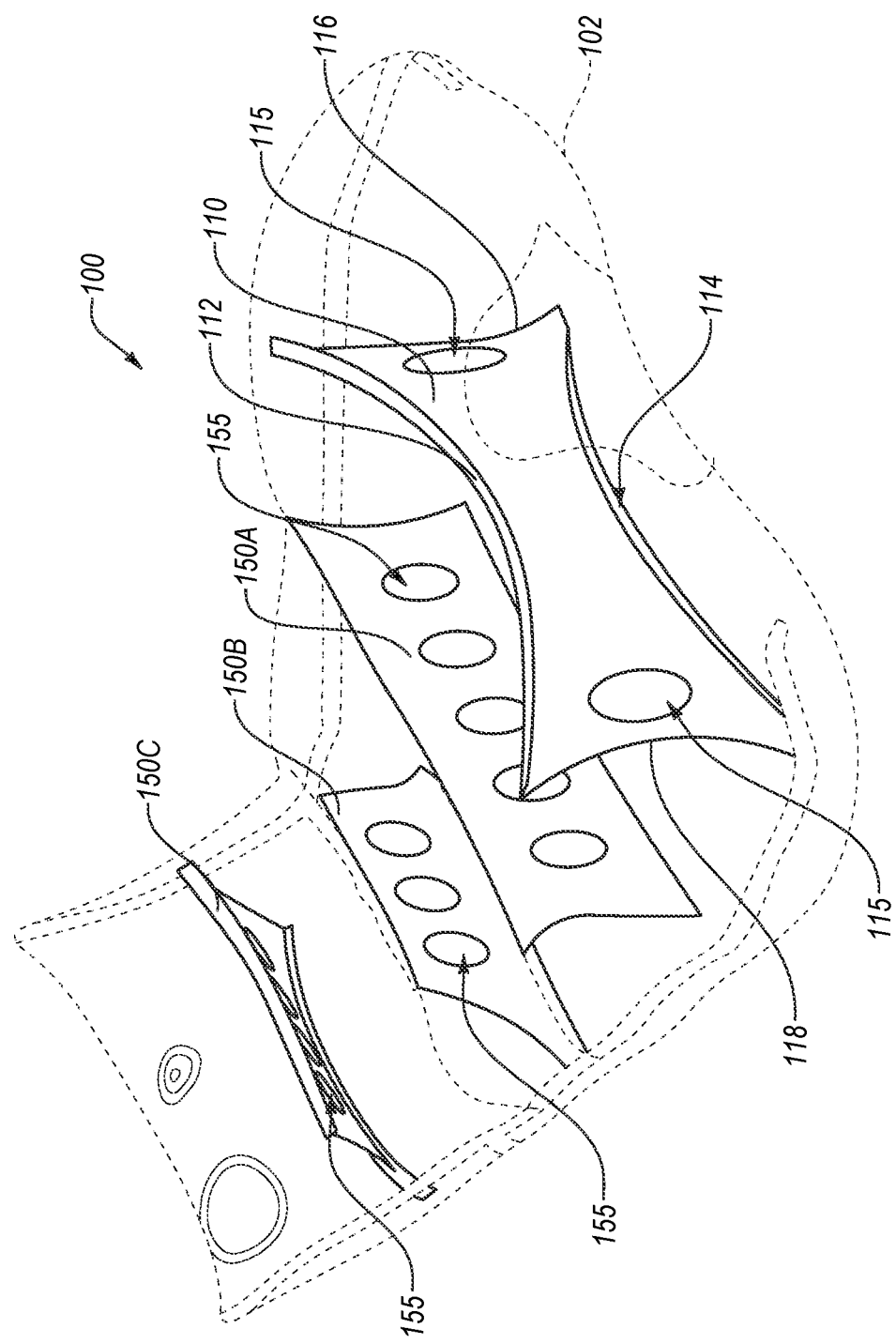
FIG. 2 depicts an airbag assembly comprising the internal tether of FIG. 1.

FIG. 2 depicts the components inside of an airbag cushion 102 of an airbag assembly 100. As illustrated in this figure, each of a plurality of tethers is sewn or otherwise coupled within the airbag cushion 102. More particularly, three straight or rectangular tethers 150A/150B/150C are coupled within the airbag cushion 102 in adjacent rows. Each of these internal tethers 150A/150B/150C comprises a plurality of vent openings 155 that may be used to allow inflation gas to pass therethrough during deployment. In the depicted embodiment, each of these vent openings 155 is spaced evenly along the length of its respective tether, which may be desirable if even distribution of inflation gas in this region is desired. It should be understood, however, that in some embodiments one or more of tethers 150A, 150B, and 150C may have the concave sides and/or hourglass shape of tether 110, if desired. Thus, whereas the depicted embodiment only has one such shaped tether, any number of such tethers, including all tethers in some embodiments, may comprise this shape.

Although not clear from the figure, it should be understood that the top and bottom sides of each of the tethers 150A/150B/150C would typically be sewn or otherwise coupled directly to the cushion 102. The opposing shorter sides extending between the top and bottom sides typically would not be sewn to the cushion 102 (although it is conceivable that they might for certain applications).

Near the end of cushion 102 furthest from the inflator (although not shown in this figure, the inflator would be positioned adjacent to internal tether 150C at the back of the assembly 100), internal tether 110 is sewn or otherwise coupled inside of cushion 102. In embodiments in which assembly 100 comprises a knee-airbag assembly, this region would correspond to the region of the airbag cushion 102 that would contact a driver's, or other occupant's, knees.

As mentioned above, preferably both but at least one of the upper side/edge 112 and the lower side/edge 114 are sewn or otherwise coupled, preferably directly, with the inner surface of cushion 102. This allows the concave shapes of these sides to modify the configuration of the cushion 102 following deployment by creating a low-profile region in the middle of the cushion 102, which may correspond with the region between an occupant's knees and thereby shift inflation gases, cushion thickness/size, and/or protection to the adjacent regions on either side of the center, which may be configured to protect the occupant's knees. The presence of vent openings 115 biased away from the center of the cushion 102 and/or biased towards opposing ends of the elongated axis of the internal tether 110 may reinforce the effect of the internal tether 110 by directing inflation gases towards the regions configured to deploy adjacent to the occupant's knees. Of course, although the preferred embodiment comprises a knee airbag assembly/system, the principles disclosed herein may be applicable to other airbags in which it may be desirable to redirect inflation gases to regions more important for protecting a certain anatomical region of an occupant or to accommodate, for example, a vehicle structure.

As mentioned above, it may be preferred to leave sides 116 and 118 unattached. This may allow inflation gases to go around the space adjacent to the concavities provided by sides 116/118 and may also allow these sides 116/118 to flex during deployment. However, it should be understood that embodiments are contemplated in which sides 116 and/or 118 are straight, or even convex, rather than being concave as shown in FIG. 1. Moreover, it is also contemplated that sides 116/118 may be sewn or otherwise coupled to the cushion 102 if desired in alternative embodiments/applications.

Figure 3:
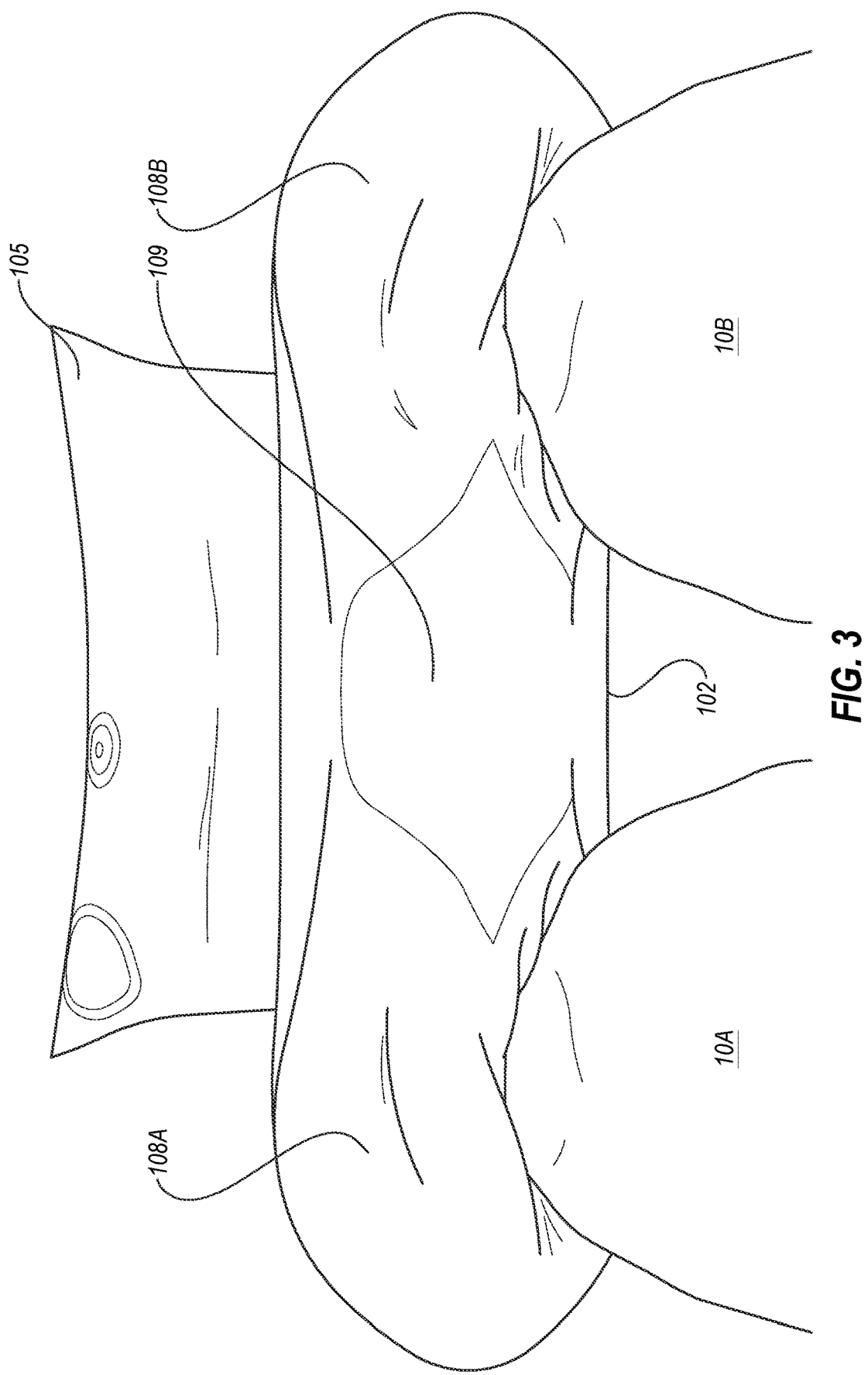
FIG. 3 depicts the airbag assembly of FIG. 2 during deployment against a vehicle occupant's knees.

FIG. 3 depicts airbag system 100 following deployment of cushion 102 adjacent to a vehicle occupant's knees, namely, left knee 10A and right knee 10B. This view also illustrates the presence of an inflator 105, which may be part of a housing or module in some embodiments. As also shown in this figure, the presence of internal tether 110, preferably including the aforementioned concavities and intentionally offset vent openings 115, results in the formation of a low-profile or reduced deployment region 109 deploying in the area between the occupant's knees 10A/10B and of corresponding thicker/larger or enlarged deployment regions 108A/108B, each of which deploys adjacent to a respective knee 10A/10B to provide enhanced protection in the areas most needed for this type of an airbag assembly.

The shape of an inflated cushion that is provided by one or more internal tethers according to the present disclosure, such as internal tether 110, may also, or alternatively, provide other benefits. For example, as also shown in FIG. 3, low-profile or reduced deployment region 109, in conjunction with enlarged deployment regions 108A/108B, may provide angled surfaces for contact with a driver or other occupant's knees to prevent, or at least inhibit, the knees from sliding off of the cushion 102, particularly during oblique impact collisions. Such oblique impacts often generate lateral forces that often result in the knees sliding off of the typical knee airbag cushions, which are usually flat along the side facing the driver/occupant. Thus, by providing surfaces that are angled towards the center of the cushion, the cushion may facilitate the generation of forces on the occupant's knees in one or more directions opposing the lateral forces that might otherwise result in the knees sliding off of the cushion during deployment/impact.

Figure 4:
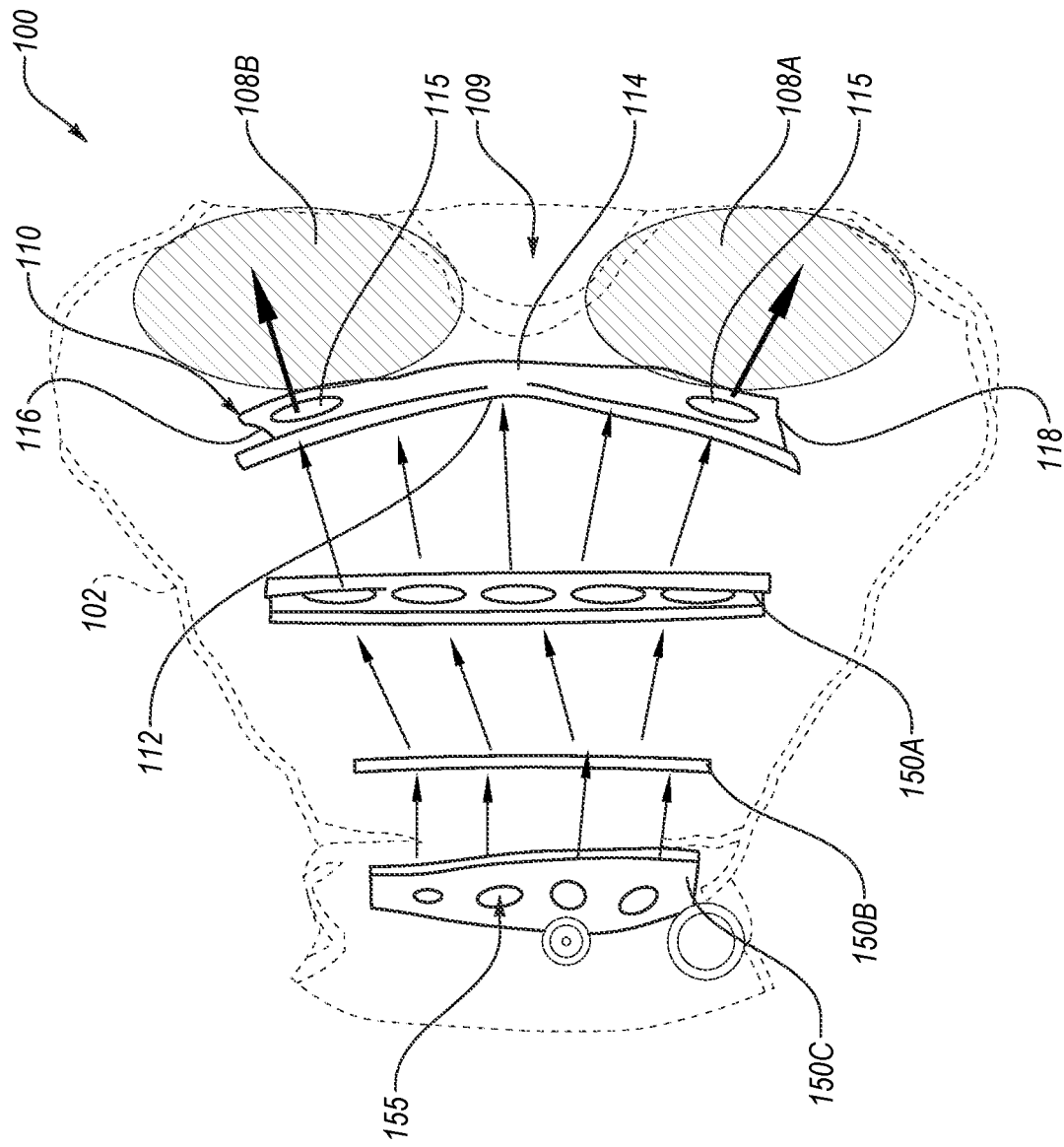
FIG. 4 depicts the flow of inflation gases within an airbag assembly during deployment according to some embodiments.

FIG. 4 again depicts the inside of airbag cushion 102 of airbag cushion assembly 100 during deployment to illustrate the guided directionality of inflation gases provided by certain preferred embodiments. As shown in this figure, each of the straight/rectangular tethers 150A/150B/150C has evenly distributed and non-biased vent openings 155 that results, at the regions closest to the inflator, in a mostly even distribution of inflation gases, as indicated by the arrows in the figure.

However, once the inflation gas reaches tether 110, it is forced to the opposing outer regions of the cushion through the positionally-biased openings 115 on the outer regions of tether 110. This enhances and reinforces the impact of sewing or otherwise coupling the opposing concave sides 112/114 of tether 110 to the cushion 102 to create a reduced deployment region 109 in the front center of the cushion and enlarged deployment regions 108A/108B on either side of reduced deployment region 109.

The foregoing specification has been described with reference to various embodiments and implementations. However, one of ordinary skill in the art will appreciate that various modifications and changes can be made without departing from the scope of the present disclosure. For example, various operational steps, as well as components for carrying out operational steps, may be implemented in various ways depending upon the particular application or in consideration of any number of cost functions associated with the operation of the system. Accordingly, any one or more of the steps may be deleted, modified, or combined with other steps. Further, this disclosure is to be regarded in an illustrative rather than a restrictive sense, and all such modifications are intended to be included within the scope thereof. Likewise, benefits, other advantages, and solutions to problems have been described above with regard to various embodiments. However, benefits, advantages, solutions to problems, and any element(s) that may cause any benefit, advantage, or solution to occur or become more pronounced, are not to be construed as a critical, a required, or an essential feature or element.

Those having skill in the art will appreciate that many changes may be made to the details of the above-described embodiments without departing from the underlying principles of the invention. The scope of the present invention should, therefore, be determined only by the following claims.

The invention claimed is:

1. A knee airbag cushion assembly, comprising:
an inflatable cushion configured to be deployed to provide protection to an occupant's lower extremities during an impact event, wherein the inflatable cushion comprises:
an internal tether positioned within the inflatable cushion and coupled to the inflatable cushion such that a first end of the internal tether is configured to be positioned adjacent to a left knee of an occupant during deployment and a second end of the internal tether opposite from the first end is configured to be positioned adjacent to a right knee of the occupant during deployment, wherein the internal tether comprises an upper end extending between the first end and the second end that defines a concave shape that is positioned and configured to increase a thickness of the inflatable cushion at regions configured to deploy adjacent to and at the occupant's knees and decrease a thickness of the inflatable cushion at a region configured to deploy adjacent to a space between the occupant's knees; and
one or more additional internal tethers positioned distally of the internal tether relative to the occupant, wherein the internal tether comprises one or more vent openings formed therein, wherein at least one of the one or more additional internal tethers comprises one or more vent openings formed therein, and wherein the one or more vent openings of the internal tether differ from the one or more vent openings of the one or more vent openings of the one or more additional internal tethers so as to reinforce the effect of the concave shape by directing inflation gases towards the regions configured to deploy adjacent to and at the occupant's knees.

2. The knee airbag cushion assembly of claim 1, wherein the inflatable cushion is configured to be deployed adjacent to a vehicle steering column, wherein the internal tether further comprises a plurality of vent openings formed therein, and wherein the plurality of vent openings is biased towards the first and second ends to reinforce the effect of the concave shape by directing inflation gases towards the regions configured to deploy adjacent to the occupant's knees.

3. The knee airbag cushion assembly of claim 1, wherein the internal tether is devoid of vent openings along the region configured to deploy adjacent to the space between the occupant's knees.

4. The knee airbag cushion assembly of claim 1, wherein the internal tether further comprises a lower end extending between the first end and the second end that defines a concave shape that is positioned and configured to increase a thickness of the inflatable cushion at regions configured to deploy adjacent to the occupant's knees and decrease a thickness of the inflatable cushion at the region configured to deploy adjacent to the space between the occupant's knees.

5. The knee airbag cushion assembly of claim 4, wherein the upper end extending between the first end and the second end is sewn to a first internal surface of the inflatable cushion, and wherein the lower end extending between the first end and the second end is sewn to a second internal surface of the inflatable cushion to define a cushion thickness therebetween.

6. The knee airbag cushion assembly of claim 4, wherein the internal tether further comprises a concave shape extending along the first end and a concave shape extending along the second end.

7. The knee airbag cushion assembly of claim 6, wherein the internal tether is not coupled to the inflatable cushion along the concave shape extending along the first end, and wherein the internal tether is not coupled to the inflatable cushion along the concave shape extending along the second end.

8. The knee airbag cushion assembly of claim 1, wherein at least one of the one or more additional internal tethers comprises a rectangular shape.

9. The knee airbag cushion assembly of claim 1, wherein the concave shape comprises a smoothly curving concave shape.

10. An airbag cushion assembly, comprising:
an inflatable cushion; and
an internal tether comprising an elongated axis positioned within the inflatable cushion, wherein the internal tether comprises a first concave portion attached to a first internal surface of the inflatable cushion and a second concave portion attached to a second internal surface of the inflatable cushion, wherein the first concave portion and the second concave portion are configured to redirect inflation of the inflatable cushion to form, upon deployment, two enlarged deployment regions and a reduced deployment region between the two enlarged deployment regions, wherein the internal tether further comprises a third concave portion extending along a first end of the elongated axis from an upper portion to a lower portion of the inflatable cushion and a fourth concave portion extending along a second end of the elongated axis from an upper portion to a lower portion of the inflatable cushion, and wherein both the third and fourth concave portions are concave inwards towards one another.

11. The airbag cushion assembly of claim 10, wherein the airbag cushion assembly comprises a knee airbag assembly, and wherein the two enlarged regions are configured to deploy adjacent to a vehicle occupant's knees.

12. The airbag cushion assembly of claim 10, wherein the internal tether further comprises a plurality of vent openings.

13. The airbag cushion assembly of claim 12, wherein the plurality of vent openings is biased towards opposing ends of the elongated axis.

14. The airbag cushion assembly of claim 13, wherein the internal tether lacks any vent openings along a central portion of the internal tether corresponding with the reduced deployment region.

15. The airbag cushion assembly of claim 10, wherein the third concave portion and the fourth concave portion are both unattached to the inflatable cushion.

16. The airbag cushion assembly of claim 10, wherein the third concave portion and the fourth concave portion are configured to improve the flexibility of the internal tether during expansion of the inflatable cushion.

17. A knee airbag cushion assembly, comprising:
an inflatable cushion configured to be deployed to provide protection to an occupant's knees during an impact event; and
a plurality of internal tethers configured to modify deployment characteristics of the inflatable cushion, wherein at least one of the plurality of tethers comprises a pair of opposing concave sides, wherein each of the opposing concave sides is attached to a respective internal surface of the inflatable cushion to reshape the inflatable cushion during deployment, and wherein the at least one of the plurality of tethers further comprises one or more vent openings configured to enhance the reshaping of the inflatable cushion provided by the pair of opposing concave sides, and wherein the plurality of internal tethers further comprises at least one internal tether lacking any concave sides.

18. The knee airbag cushion assembly of claim 17, wherein the one or more vent openings comprises a first vent opening positioned adjacent to a first end of the at least one of the plurality of tethers and a second vent opening positioned adjacent to a second end of the least one of the plurality of tethers.

19. The knee airbag cushion assembly of claim 18, wherein the at least one of the plurality of tethers lacks any vent openings between the first vent opening and the second vent opening.

20. The knee airbag cushion assembly of claim 17, wherein the plurality of internal tethers comprises a plurality of internal tethers lacking any concave sides, and wherein each of the at least one of the plurality of tethers comprising a pair of opposing concave sides is positioned proximally of each of the plurality of internal tethers lacking any concave sides relative to an occupant.

* * * * *